(12) United States Patent
Oki

(10) Patent No.: US 10,771,688 B2
(45) Date of Patent: Sep. 8, 2020

(54) IMAGE PROCESSING DEVICE, DRIVING SUPPORT SYSTEM, AND IMAGE PROCESSING METHOD

(71) Applicants: Kabushiki Kaisha Toshiba, Minato-ku, Tokyo (JP); Toshiba Electronic Devices & Storage Corporation, Minato-ku, Tokyo (JP)

(72) Inventor: Yutaka Oki, Ome Tokyo (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 66 days.

(21) Appl. No.: 16/129,014

(22) Filed: Sep. 12, 2018

(65) Prior Publication Data

US 2019/0297254 A1   Sep. 26, 2019

(30) Foreign Application Priority Data

Mar. 20, 2018   (JP) ................. 2018-052868

(51) Int. Cl.
*H04N 5/232* (2006.01)
*G06T 7/73* (2017.01)
*G06T 5/00* (2006.01)
*G02B 30/00* (2020.01)

(52) U.S. Cl.
CPC ......... *H04N 5/23229* (2013.01); *G02B 30/00* (2020.01); *G06T 5/006* (2013.01); *G06T 7/74* (2017.01); *G06T 2207/30252* (2013.01)

(58) Field of Classification Search
CPC .... H04N 5/23229; G02B 30/00; G06T 5/006; G06T 7/74; G06T 2207/30252
See application file for complete search history.

(56) References Cited

U.S. PATENT DOCUMENTS

| 9,378,553 B2 | 6/2016 | Tamura et al. |
| 2008/0309763 A1* | 12/2008 | Hongo ............... B60R 1/00 348/148 |
| 2010/0194886 A1 | 8/2010 | Sari et al. |
| 2010/0231717 A1* | 9/2010 | Sasaki ............... G06T 5/006 348/148 |

(Continued)

FOREIGN PATENT DOCUMENTS

| EP | 2200311 A1 | 6/2010 |
| JP | 2009-100342 A | 5/2009 |

(Continued)

*Primary Examiner* — Yogesh K Aggarwal
(74) *Attorney, Agent, or Firm* — White & Case LLP

(57) ABSTRACT

According to one embodiment, an image processing device that processes a first image and a second image captured by a camera includes a first circuit, a second circuit and a third circuit. The first circuit determines a first position of a first reference line and a second position of a second reference line in at least one of the first image and the second image. The second circuit determines a image deformation reduction parameter based on a line width from a first reference point on the first reference line at the first position to a second reference point on the second reference line at the second position. The third circuit reduces image deformation in the first image or the second image based on the image deformation reduction parameter.

17 Claims, 8 Drawing Sheets

(56) References Cited

U.S. PATENT DOCUMENTS

2013/0147918 A1\* 6/2013 Kakuko ............... H04N 13/204
 348/46
2013/0147948 A1 6/2013 Higuchi et al.
2013/0286221 A1\* 10/2013 Shechtman ............... G06T 5/00
 348/187

FOREIGN PATENT DOCUMENTS

| JP | 2012-075060 A | 4/2012 |
| JP | 2015-191548 A | 11/2015 |
| JP | 5906272 B2 | 4/2016 |
| JP | 2016-225719 A | 12/2016 |
| JP | 2017-9387 A | 1/2017 |
| WO | 2017036927 A1 | 3/2017 |

\* cited by examiner

SECOND IMAGE

FIRST IMAGE

FIRST IMAGE

SECOND IMAGE

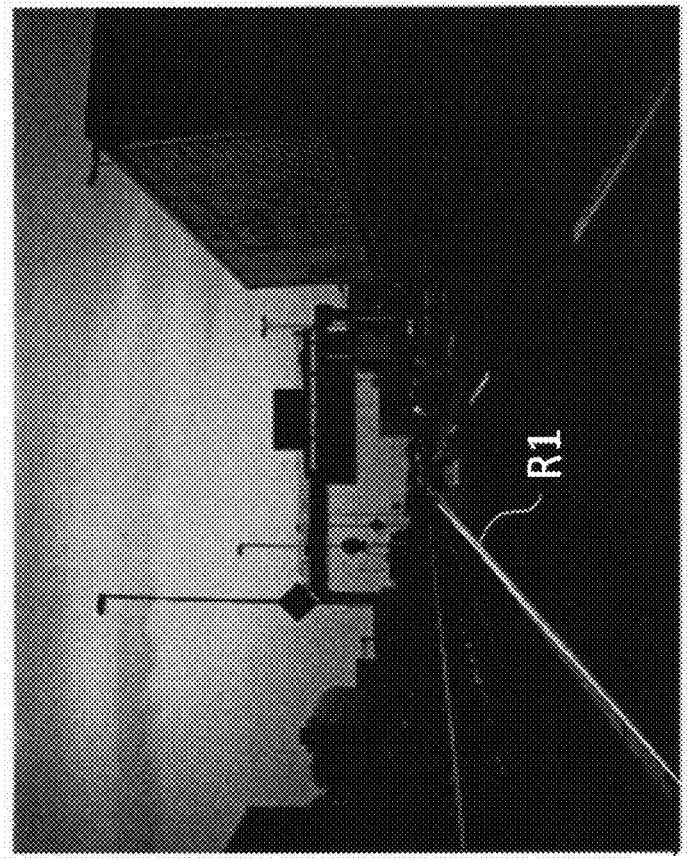
Fig. 5B — SECOND IMAGE
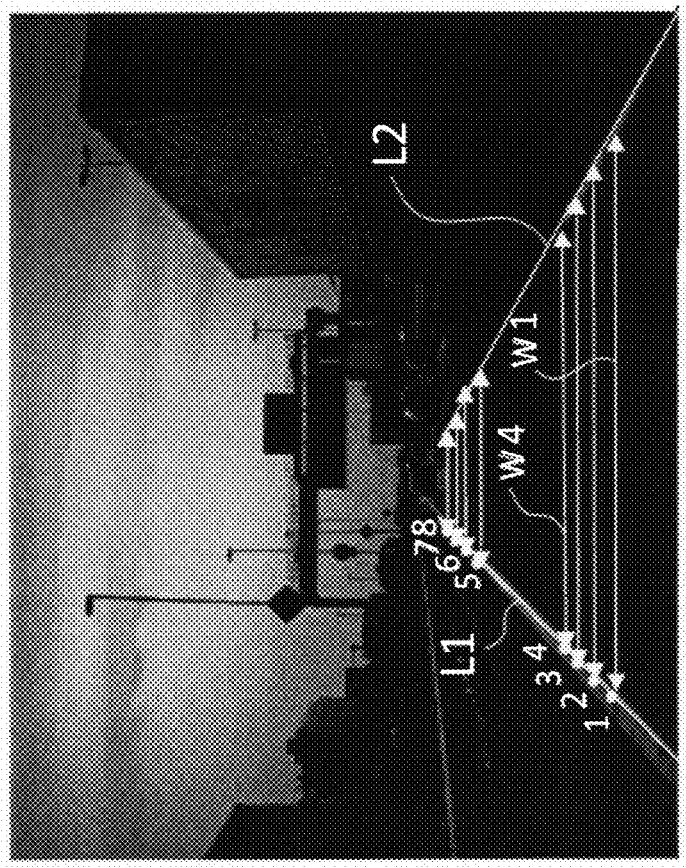
Fig. 5A — FIRST IMAGE

IMAGE PROCESSING DEVICE, DRIVING SUPPORT SYSTEM, AND IMAGE PROCESSING METHOD

CROSS-REFERENCE TO RELATED APPLICATIONS

This application is based upon and claims the benefit of priority from Japanese Patent Application No. 2018-052868, filed Mar. 20, 2018, the entire contents of which are incorporated herein by reference.

FIELD

Embodiments relate to an image processing device, a driving support system, and an image processing method.

BACKGROUND

A technology has been known for calculating a corresponding point between two images acquired by a stereo camera and measuring a three-dimensional position of an object from a positional relationship between the cameras and a position of a corresponding point on each image. The technology is used in various fields such as a driver assistance system for vehicle, a portable device, and a game machine.

However, an image deformation or the like involved in a yaw rotation around an optical axis of the stereo camera occurs due to temperature characteristics and vibration characteristics of an adjustment device on which the stereo camera is placed, an aging change of the stereo camera itself, and the like.

BRIEF DESCRIPTION OF DRAWINGS

FIGS. 5A and 5B are views showing three or more reference points on a reference line;

DETAILED DESCRIPTION

Figure 1:
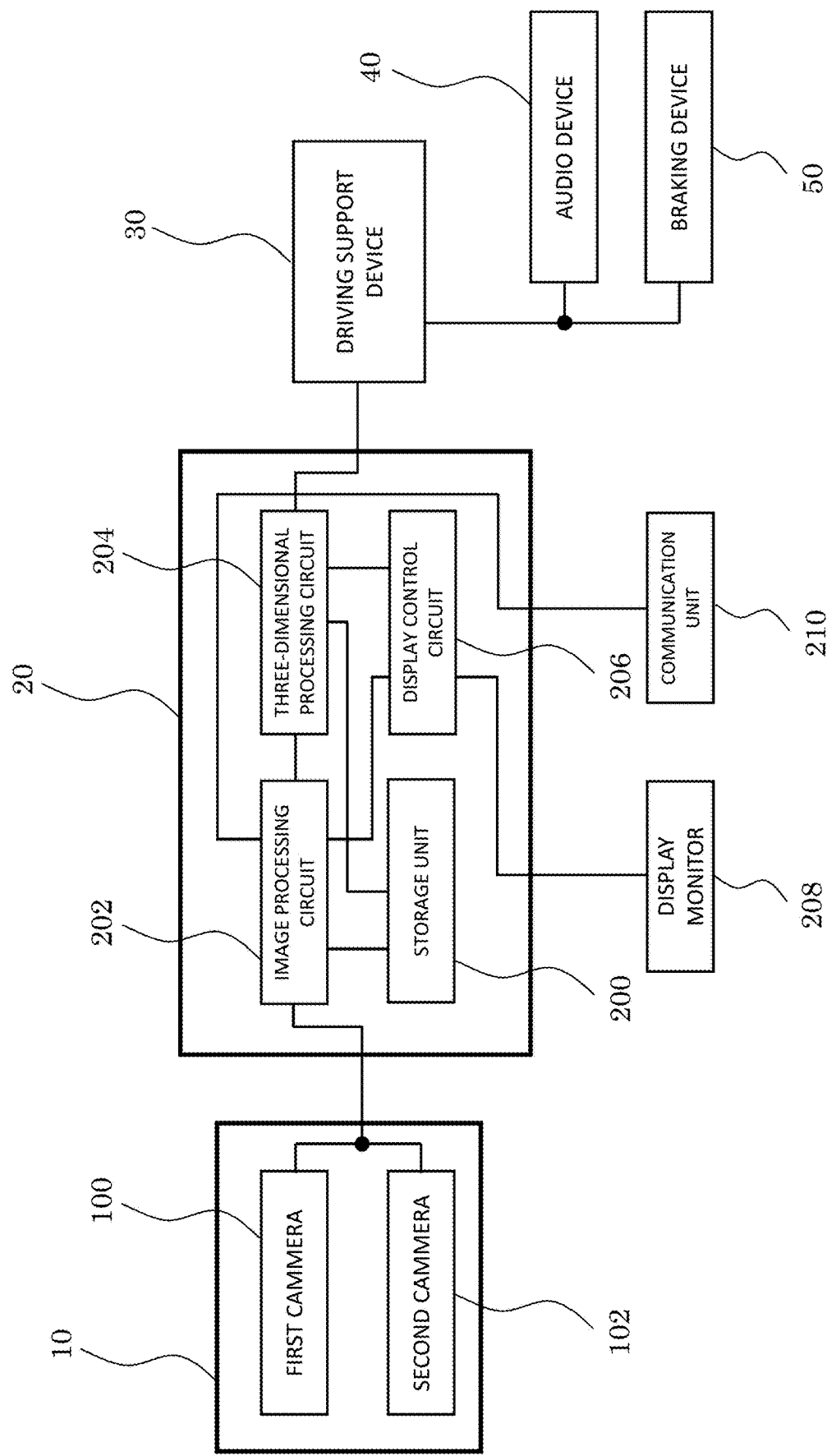
FIG. 1 is a block diagram showing an overall configuration of a driving support system according to an embodiment.

According to one embodiment, there is provided an image processing device that processes a first image and a second image captured by a stereo camera.

The image processing device includes a reference line disposing circuit and a parameter acquiring circuit. The reference line disposing circuit disposes two reference lines in the first image. The parameter acquiring circuit acquires a parameter of an image correction processing that reduces a parallax between the first image and the second image at an intersection point in which the two reference lines are extended so as to be close to 0.

Hereinafter, a driving support system according to an embodiment of the present invention will be described in detail with reference to the drawings. Further, the embodiment shown below is one example of the embodiment of the present invention, and the present invention is not limited to the embodiment. In addition, in the drawings referenced in the present embodiment, portions having the same or similar functions are denoted by the same or similar reference numerals, and repetitive descriptions thereof may be omitted. In addition, a dimension ratio of the drawings may be different from an actual ratio for convenience of explanation, or a portion of the configuration may be omitted from the drawings.

Embodiment

FIG. 1 is a block diagram showing an overall configuration of a driving support system 1 according to an embodiment. As shown in FIG. 1, the driving support system 1 is a system that generates three-dimensional information by a stereo image and supports driving of a vehicle. More specifically, the driving support system 1 is configured to include a stereo camera 10, an image processing device 20, a driving support device 30, an audio device 40, and a braking device 50.

The stereo camera 10 is configured to include a first camera 100 and a second camera 102. Each of the cameras 100 and 102 has, for example, a CMOS image sensor as an imaging element. Therefore, the first camera 100 captures a first image and the second camera 102 captures a second image. An optical axis of an imaging optical system of each of the cameras 100 and 102 is set to a Z axis and an image captured surface of the CMOS image sensor in which the imaging elements are two dimensionally disposed is disposed on an X-Y plane in parallel.

The image processing device 20 is a device that performs an image processing for the first image and the second image captured by the stereo camera 10 to obtain three-dimensional information, and is configured to include a central processing unit (CPU). A detailed configuration of the image processing device 20 will be described below.

The driving support device 30 supports driving of a vehicle according to an output signal of the image processing device 20. The driving support device 30 is connected with the audio device 40, the braking device 50, and the like.

The audio device 40 is, for example, a speaker, and is disposed at a position which is audible from a driver's seat in the vehicle. The driving support device 30 generates, for example, an audio such as "object is 5 meters away" to the audio device 40, based on the output signal of the image processing device 20. Therefore, for example, even in a case in which an attention of the driver is decreased, it is possible to call the attention of the driver by listening to the audio.

The braking device 50 is, for example, an auxiliary brake, and brakes the vehicle based on the output signal of the image processing device 20. The driving support device 30 causes the braking device 50 to brake the vehicle, for example, when the object is close to a predetermined distance, for example, 3 meters.

Here, a detailed configuration of the image processing device 20 will be described. The image processing device 20 has a function of correcting an image deformation and the like due to temperature characteristics and vibration characteristics of an adjustment device on which the stereo camera 10 is placed, a rotation around a yaw angle of the stereo camera 10 itself, and the like. The image processing device 20 includes a storage unit 200, an image processing circuit 202, a three-dimensional processing circuit 204, a display control circuit 206, a display monitor 208, and a communication unit 210.

The storage unit 200 is configured to include, for example, a read only memory (ROM), a random access memory (RAM), and the like, and stores a program related to the image processing, a parameter of an image correction processing used in the image processing circuit 202, a control parameter, and the like. The image processing device 20 according to the present embodiment implements the function of the image processing device 20 by executing the program stored in the storage unit 200.

The image processing circuit 202 is a processing circuit that performs a correction processing of the first image and the second image captured by the stereo camera 10. For example, the image processing circuit 202 can correct an image deformation involved in a distortion of the imaging system of the stereo camera, a roll and a pitch rotation of the imaging system, particularly, a yaw rotation around the optical axis of the stereo camera 10, and the like. Further, a detailed configuration of the image processing circuit 202 will be described below.

The three-dimensional processing circuit 204 is a processing circuit that obtains three-dimensional information by matching stereos of the first and second images corrected by the image processing circuit 202. When a coordinate of a pixel on the first image is set to (XL, YL) and a coordinate of a pixel on the corresponding second image is set to (XR, YR), the three-dimensional processing circuit 204 acquires a value of Z by, for example, Equation $$Z = \frac{f \times h}{XL - XR} \quad (1)$$

Here, a focal distance of the imaging optical system of each of the cameras 100 and 102 is set to f and an interval between the cameras 100 and 102 is set to h. A deviation (XL−XR) of an X coordinate of a corresponding point of the first image and the second image corresponds to a parallax.

In addition, the three-dimensional processing circuit 204 is a processing circuit that performs a processing of extracting an object, for example, a person or a vehicle, from, for example, a three-dimensional point group (X, Y, Z). In addition, the three-dimensional processing circuit 204 performs, for example, a color processing or the like of allocating color according to the value of Z of the three-dimensional point group (X, Y, Z) after conversion to the pixel (XL, YL) of the first image.

The display control circuit 206 is a processing circuit that performs a control causing the display monitor 208 to display the information obtained by the image processing circuit 202. For example, the display control circuit 206 causes the display monitor 208 to display information on a parameter obtained by a parameter acquiring circuit 218 to be described below. In addition, the display control circuit 206 may cause the display monitor 208 to display the image after the color processing obtained by the three-dimensional processing circuit 204, position information of the object, or the like.

The display monitor 208 is, for example, a liquid crystal monitor, and displays the information obtained by the image processing circuit 202 as described above. The communication unit 210 is configured to include, for example, an antenna, and transmits the information obtained by the image processing circuit 202 to a management device (not shown). The management device is, for example, a server and is used for quality management of the driving support system 1.

Figure 2:
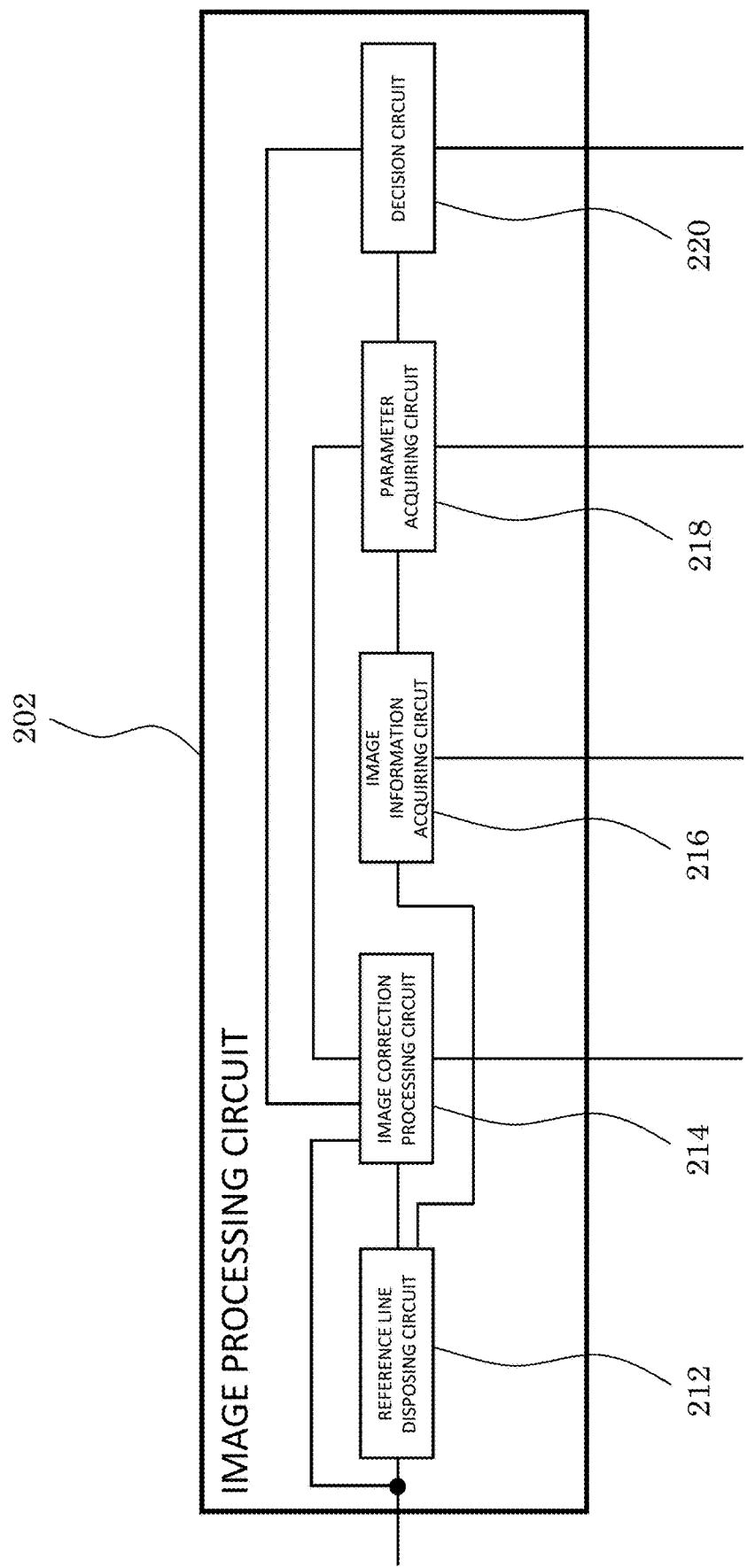
FIG. 2 is a block diagram showing a detailed configuration of an image processing circuit.

FIG. 2 is a block diagram showing a detailed configuration of the image processing circuit 202. As shown in FIG. 2, the image processing circuit 202 is configured to include a reference line disposing circuit 212, an image correction processing circuit 214, an image information acquiring circuit 216, a parameter acquiring circuit 218, and a decision circuit 220.

Figure 3B:
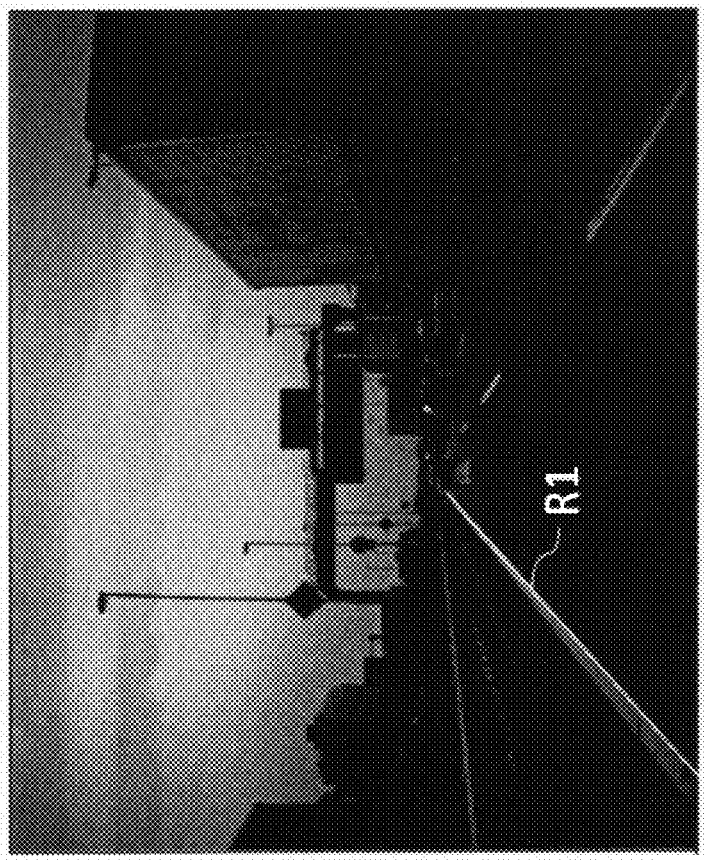
FIGS. 3A and 3B are views showing images captured by a stereo camera.
Figure 3A:
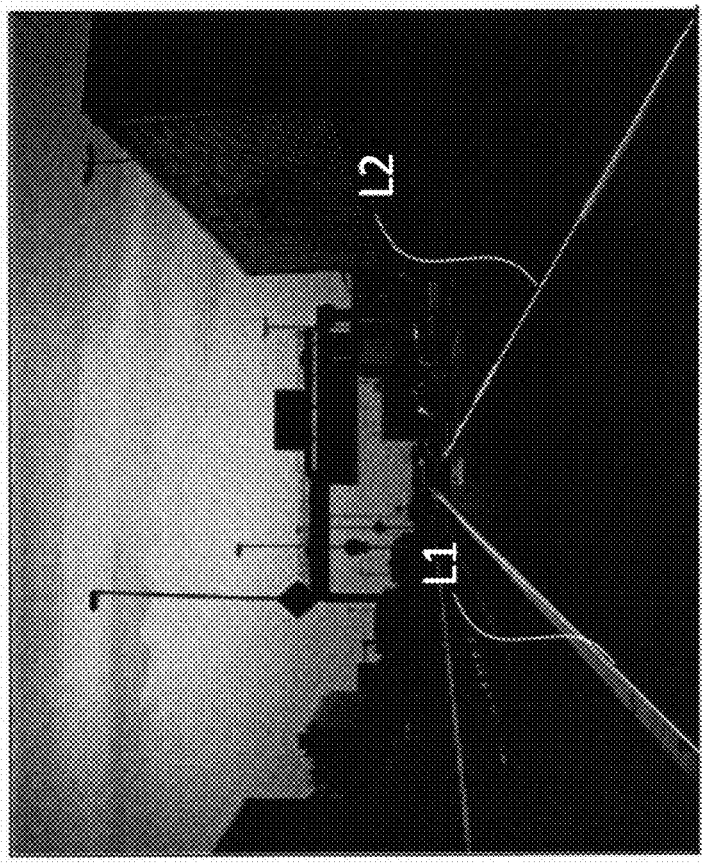

FIGS. 3A and 3B are views showing images captured by the stereo camera 10. FIG. 3A shows a first image captured by the first camera 100 and FIG. 3B shows a second image captured by the second camera 102. As shown in FIG. 3A, two reference lines L1 and L2 are disposed along, for example, inside lines of white lines on a road.

As shown in FIGS. 3A and 3B, the reference line disposing circuit 212 disposes the two reference lines L1 and L2 corresponding to parallel lines in an actual space in at least one of the first image and the second image. For example, the reference line disposing circuit 212 disposes the two reference lines L1 and L2 whose widths change to a substantially linear shape in accordance with a distance from the stereo camera 10 in the first image. For this reason, the two reference lines L1 and L2 are not limited to the inside lines of the white lines, and may be outside lines. Alternatively, one of the two reference lines may be set to the inside line and the other may be set to the outside line. In addition, a guard rail, a curbstone, and the like may be used as the reference line as long as the above condition is satisfied.

In addition, the reference line disposing circuit 212 may dispose a second reference line R1 corresponding to the reference line L1 in the second image, for calculation of parallax. Therefore, the information of the parallax can be acquired by acquiring a point corresponding to a reference point on the reference line L1 from the second reference line R1. Further, in a case in which the point corresponding to the reference point on the reference line L1 can be acquired, the second reference line R1 may not be disposed.

For example, the reference line disposing circuit 212 disposes the two reference lines L1 and L2 by detecting a segment by a general segment extraction algorithm and detecting a combination of two segments whose widths change to a linear shape in accordance with a distance from the stereo camera 10. A timing at which the reference line disposing circuit 212 detects the segments to dispose the two reference lines L1 and L2 may be set to a point of time suitable for a predetermined condition. The reference line disposing circuit 212 has, for example, a GPS function, and starts to detect the segment when a straight road on map information reaches a position that continues for a predetermine distance or more. For example, the reference line disposing circuit 212 starts to detect the segment when the white line reaches a position that continues for a predetermined distance, for example, 100 m, or more in a straight line. Therefore, it is possible to more efficiently dispose the reference lines L1 and L2.

Figure 6A:
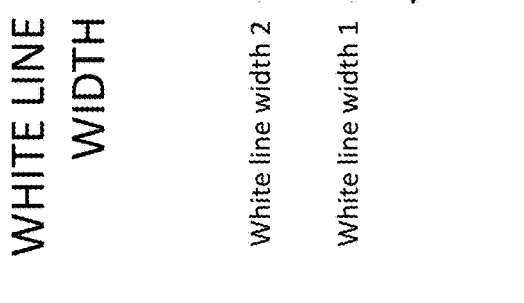
FIGS. 6A and 6B are conceptual views of a parameter of an image correction processing by the two reference points.
Figure 7A:
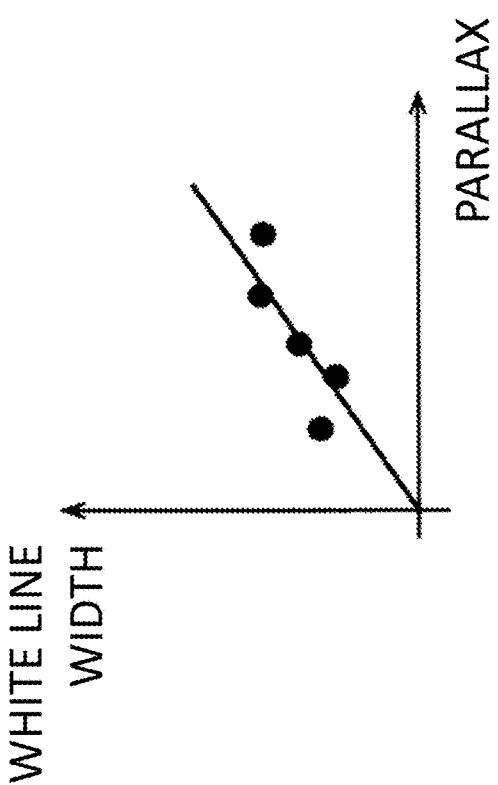
FIGS. 7A and 7B are conceptual views of a parameter of an image correction processing by the three or more reference points.

As can be seen from those above, it is desirable that the two reference lines L1 and L2 are parallel in actual space to improve correction accuracy, but they may not be completely parallel to obtain a correction effect. For example, as shown in FIGS. 6A and 7A to be described below, when a parallax of each of the two or more reference points on the reference line L1 and a width between the reference lines L1 and L2 of the parallel lines passing through the respective reference points are monotonously increased according to an increase in the parallax, it is possible to obtain the correction effect. Further, in the present embodiment, the two reference lines L1 and L2 are disposed in the first image, but are not limited thereto, and may be disposed in the second image. Alternatively, the two reference lines may be disposed in the first image and the second image.

The image correction processing circuit 214 performs an image correction processing for at least one of the first and second images by using the parameter acquired by the parameter acquiring circuit 218. Further, the parameter acquiring circuit 218 will be described below.

More specifically, the image correction processing circuit 214 performs the image correction processing on at least one of the first image and the second image by, for example, a coordinate change represented in Equations (2) and (3), so that a parallax of a corresponding infinite point of the first image and the second image is reduced and is close to 0, by using the parameter acquired by the parameter acquiring circuit 218. In this way, the image correction processing circuit 214 performs an image correction processing using, for example, a homography transformation.

Here, it is assumed that a rotation matrix is $M_L$, ( )x, ( )y, and ( )z are X, Y, and Z components of a vector, $K_1$ is an internal parameter of the stereo camera 10 described above, $K_2$ is an internal parameter of the stereo camera 10 after the homography transformation, PL is a position vector of one coordinate point in the first image before the homography transformation, XL' is an X coordinate of the position vector PL after the homography transformation, and YL' is a Y coordinate. The parameter acquired by the parameter acquiring circuit 218 means the rotation matrix $M_L$.

$$XL' = \frac{(K_2 M_L K_1^{-1} PL)_X}{(K_2 M_L K_1^{-1} PL)_Z} \quad (2)$$

$$YL' = \frac{(K_2 M_L K_1^{-1} PL)_Y}{(K_2 M_L K_1^{-1} PL)_Z} \quad (3)$$

Therefore, when the image correction processing circuit 214 performs the image correction processing for the first image in which the two reference lines L1 and L2 corresponding to the parallel lines in the actual space are disposed, the parallax between the first image and the second image corresponding to an intersection point (infinite point) at which the two reference lines L1 and L2 parallel to each other in the actual space are extended is reduced and is close to 0. In this way, when the image deformation involved in the distortion of the imaging system including the rotations of the roll and the pitch of the imaging system generated in the first image and the second image, the yaw rotation around the optical axis of the imaging optical system, and the like is corrected, the parallax in the first image and the second image of the corresponding infinite point is reduced and is close to zero.

In this way, the image correction processing circuit 214 can perform the image correction of the image deformation due to temperature characteristics, vibration characteristics, an aging change, and the like of a jig or the like of the adjustment device of the stereo camera 10, the distortion of the imaging system including the rotations of the roll and the pitch of the imaging system, the image deformation involved in the yaw rotation or the like around the optical axis of the imaging optical system of the stereo camera 10, and the like.

The image information acquiring circuit 216 acquires a parallax of each of the plurality of reference points on one of the two reference lines L1 and L2 disposed by the reference line disposing circuit 212 and a width between the reference lines of the parallel lines passing through the respective reference lines. The acquired parallax and width are used to acquire a parameter by the parameter acquiring circuit 218 to be described below.

Figure 4A:
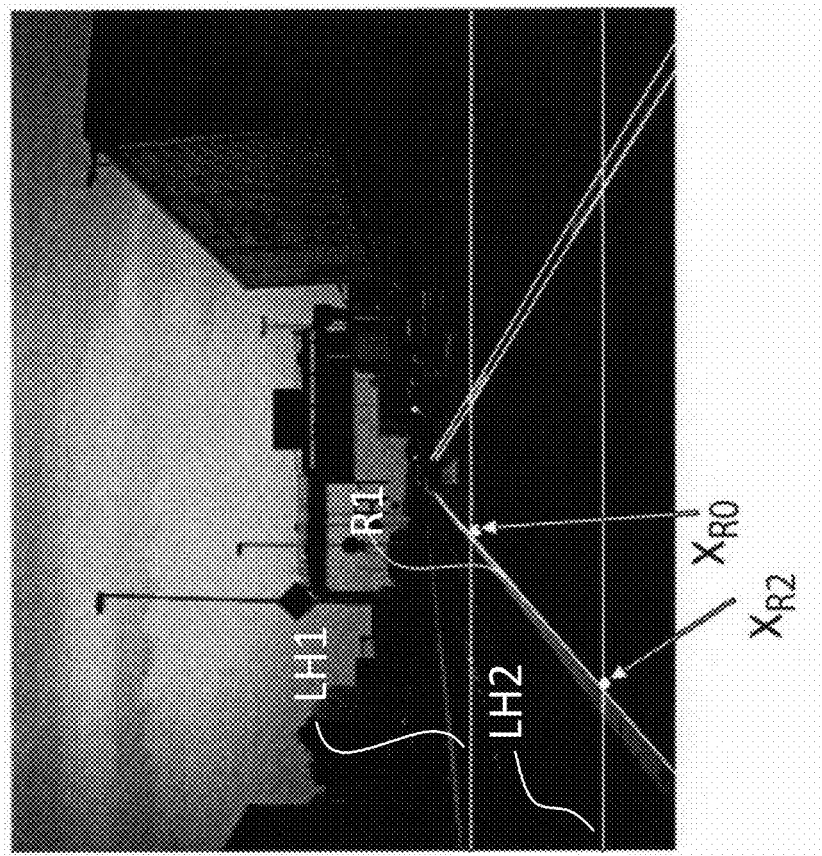
FIGS. 4A and 4B are views showing two reference points on a reference line.
Figure 4B:
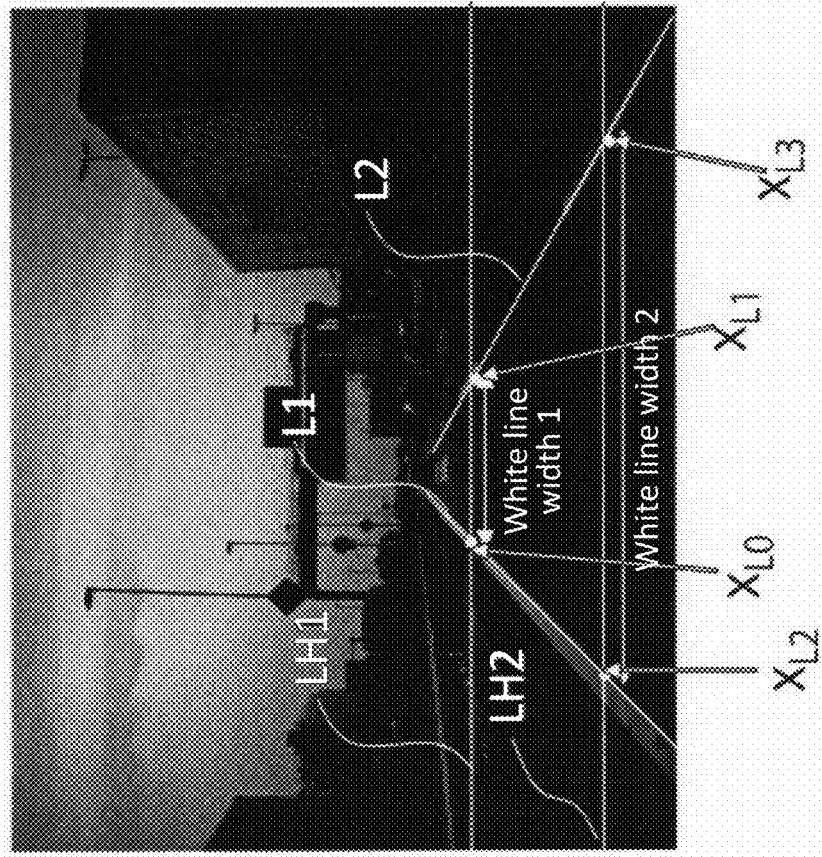

FIGS. 4A and 4B are views describing examples of a parallax of each of two reference points $X_{L0}$ and $X_{L2}$ acquired by the image information acquiring circuit 216 and a width between the reference lines of parallel lines passing through the respective reference points, when a parameter is acquired by the two reference points. FIG. 4A shows a first image captured by the first camera 100 and FIG. 4B shows a second image captured by the second camera 102. As shown in FIG. 4A, the two reference lines L1 and L2 are disposed along the inside lines of white lines on the road and the second line R1 corresponding to the reference line L1 is disposed in the second image.

A first straight line LH1 and a second straight line LH2 are parallel lines. Intersection points of the first straight line LH1 with the reference lines L1 and L2 and the second line R1 are $X_{L0}$, $X_{L1}$, and $X_{R0}$, respectively. Similarly, intersection points of the second straight line LH2 with the reference lines L1 and L2 and the second line R1 are $X_{L2}$, $X_{L3}$, and $X_{R2}$, respectively.

As can be seen from the intersection points above, a parallax 1 of the first reference point $X_{L0}$ on the reference line L1 is ($X_{L0}$-$X_{RU}$) and a parallax 2 of the second reference point $X_{L2}$ on the reference line L1 is ($X_{L2}$-$X_{R2}$). In addition, a white line width 1 is ($X_{L1}$-$X_{L0}$) and a white line width 2 is ($X_{L3}$-$X_{L2}$).

In this way, when the parameter is acquired by the two reference points, the image information acquiring circuit 216 acquires the parallax 1 of the first reference point $X_{L0}$ on the reference line L1 of ($X_{L0}$-$X_{R0}$) and the white line width 1 of ($X_{L1}$-$X_{L0}$), and the parallax 2 of the second reference point $X_{L2}$ of ($X_{L2}$-$X_{R2}$) and the white line width 2 of ($X_{L3}$-$X_{L2}$).

More specifically, when the parameter is acquired by the two reference points, the image information acquiring circuit 216 acquires the parallax 1 ($X_{L0}$-$X_{R0}$) of the first reference point $X_{L0}$ on one reference line L1 of the two reference lines L1 and L2 and a first width (a white line width 1 ($X_{L1}$-$X_{L0}$)) between the reference lines L1 and L2 of the first straight line LH1 passing through the first reference point $X_{L0}$ and intersecting with the other reference line L2, and the parallax 2 ($X_{L2}$-$X_{R2}$) of the second reference point $X_{L2}$ on one reference line L1 and a second width (a white line width 2 ($X_{L3}$-$X_2$)) between the reference lines L1 and L2 of the second straight line LH2 parallel to the first straight line LH1, passing through the second reference point $X_{L2}$, and intersecting with the other reference line L2. Here, since the first straight line LH1 and the second straight line LH2 are set to horizontal lines, a description of a Y coordinate is omitted. Further, the first straight line LH1 and the second straight line LH2 according to the present embodiment are set to the horizontal lines, but are not limited thereto. The first straight line LH1 and the second straight line LH2 may be parallel to each other.

FIGS. 5A and 5B are views describing examples of a parallax of each of two or more reference points 1 to 8 acquired by the image information acquiring circuit 216 and widths between the reference lines L1 and L2 of parallel lines passing through the respective reference points 1 to 8, when a parameter is acquired by the two or more reference points. FIG. 5A shows a first image captured by the first camera 100 and FIG. 5B shows a second image captured by the second camera 102. As shown in FIG. 5A, the two reference lines L1 and L2 are disposed along the inside lines of white lines on the road and the second line R1 corresponding to the reference line L1 is disposed in the second image.

As shown in FIGS. 5A and 5B, the image information acquiring circuit 216 may acquire three or more reference points. For example, as shown in FIGS. 5A and 5B, the image information acquiring circuit 216 acquires a parallax of each of the three or more reference points 1 to 8 on the one reference line L1, and widths w1 to w8 between the reference lines L1 and L2 of the parallel lines passing through the respective reference lines 1 to 8. Further, in FIG. 5, only reference numerals w1 and w4 are denoted. A processing of the parameter acquiring circuit 218 by the three or more reference points will be described below.

The parameter acquiring circuit 218 acquires a correction parameter of the image correction processing circuit based on the parallax of each of the reference points and the width between the reference lines of the parallel lines passing through the respective reference points which are acquired by the image information acquiring circuit 216.

Figure 6B:
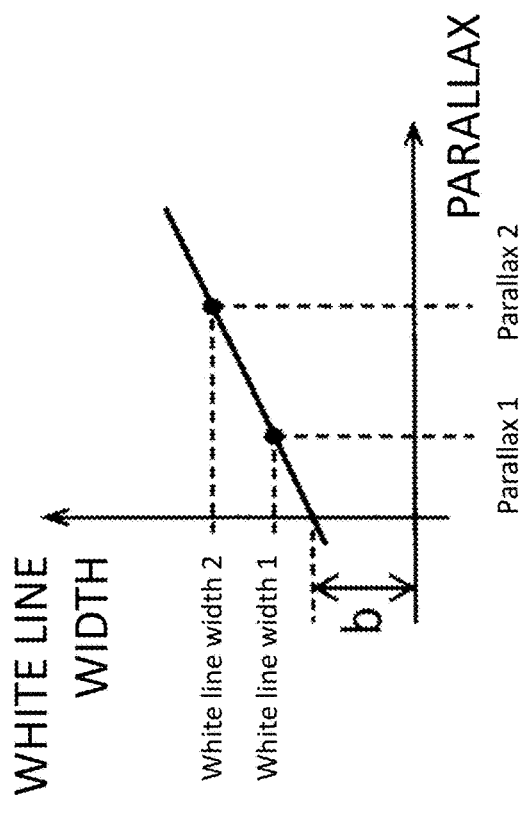

FIGS. 6A and 6B are conceptual views of a parameter of an image correction processing when the parameter is acquired by the two reference points. Here, an example of the parameter of the image correction processing by the two reference points $X_{L0}$ and $X_{L2}$ is shown. In FIGS. 6A and 6B, horizontal axes represent the parallax and vertical axes represent the width between the two reference lines L1 and L2, that is, the white line width. FIG. 6A shows a straight line connecting the parallax 1 of the reference point $X_{L0}$ and the white line width 1, and the parallax 2 of the reference point $X_{L2}$ and the white line width 2 before the image correction acquired by the image information acquiring circuit 216, and FIG. 6B shows a straight line connecting the parallax 1 of the reference point $X_{L0}$ and the white line width 1, and the parallax 2 of the reference point $X_{L2}$ and the white line width 2 after the image correction.

An intercept of the straight line connecting the parallax 1 of the reference point $X_{L0}$ and the white line width 1, and the parallax 2 of the reference point $X_{L2}$ and the white line width 2 before the image correction shows a finite value of b. Meanwhile, an intercept of the straight line connecting the parallax 1 of the reference point $X_{L0}$ and the white line width 1, and the parallax 2 of the reference point $X_{L2}$ and the white line width 2 after the image correction shows 0. As can be seen from the description above, the parameter acquiring circuit 218 acquires the parameter of the image correction processing circuit 214 that sets the intercept of the straight line connecting the parallax 1 of the reference point $X_{L0}$ and the white line width 1, and the parallax 2 of the reference point $X_{L2}$ and the white line width 2 after the coordinate change, that is, after the image correction to 0.

In other words, the parameter acquiring circuit 218 acquires the parameter of the image correction processing circuit 214 that sets a first ratio of the parallax 1 and the white line width 1 and a second ratio of the parallax 2 and the white line width 2 to be equal. Further, in the present embodiment, the image correction processing of the image correction processing circuit 214 is performed for the first image, but is not limited, and the image correction processing may be performed for the second image. Alternatively, the image correction processing may be performed for the first image and the second image.

In this way, the parameter acquiring circuit 218 acquires the parameter of the image correction processing based on the parallax 1 ($X_{L0}$-$X_{R0}$) of the first point $X_{L0}$ on one reference line L1 of the two reference lines L1 and L2 and the first width (the white line width 1 ($X_{L1}$-$X_{L0}$)) between the reference lines L1 and L2 of the first straight line LH1 passing through the first point $X_{L0}$ and intersecting with the other reference line L2, and the parallax 2 ($X_{L2}$-$X_{R2}$) of the second point $X_{L2}$ on one reference line L1 and the second width (the white line width 2 ($X_{L3}$-$X_{L2}$)) between the reference lines L1 and L2 of the second straight line $L_{H2}$ parallel to the first straight line LH1, passing through the second point $X_{L2}$, and intersecting with the other reference line L2, which are acquired by the image information acquiring circuit 216 as described above. That is, the parameter acquiring circuit 218 acquires the parameter that sets the intercept of the straight line connecting the parallax 1 ($X_{L0}$-$X_{R0}$) of the reference point $X_{L0}$ and the white line width 1, and the parallax 2 ($X_{L2}$-$X_{R2}$) of the reference point $X_{L2}$ and the white line width 2 to 0, that is, a value of each element of a rotation matrix $M_L$ represented by Equations (2) and (3). In other words, the parameter acquiring circuit 218 acquires the parameter that sets the first ratio of the parallax 1 ($X_{L0}$-$X_{R0}$) and the white line with 1 and the second ratio of the parallax 2 ($X_{L2}$-$X_{R2}$) and the white line width 2 to be equal, that is, the value of each element of the rotation matrix $M_L$ represented by Equations (2) and (3).

Figure 7B:
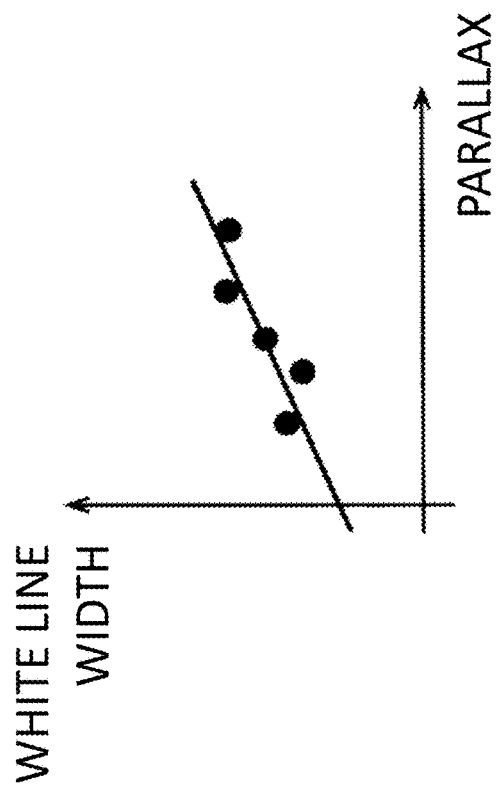

FIGS. 7A and 7B are conceptual views of a parameter of an image correction processing by the three or more reference points 1 to 8 (FIG. 5). FIG. 7A shows a straight line connecting parallaxes and white line widths of the reference points 1 to 8 before the image correction and FIG. 7B shows a straight line connecting parallaxes and white line widths of the reference points 1 to 8 after the image correction. In FIGS. 7A and 7B, horizontal axes represent the parallax and vertical axes represent the width between the two reference lines L1 and L2, that is, the white line width. In FIGS. 7A and 7B, 5 points of 8 reference points are plotted as an example. The straight line indicated on the drawing is an example of the straight line with which it is lined from the pair of two standard points, and it is lined with a straight line to each pair in fact.

Similar to FIGS. 6A and 6B, an intercept of the straight line connecting the parallaxes of the reference points 1 to 8 and the white line width of FIG. 7A shows a finite value. Meanwhile, for FIG. 7B after the image correction, an intercept of the straight line connecting the parallaxes of the reference points 1 to 8 and the white line width shows 0.

The parameter acquiring circuit 218 acquires a value of each element of the rotation matrix $M_L$ represented by Equations (2) and (3) so that a cost function E represented by, for example, Equation (4) is reduced and is close to 0.

$$\sum \left\{ \frac{(\text{Parallax 1}) \cdot (\text{White line width 2}) -}{(\text{Parallax 2}) - (\text{Parallax 1})} \right\}^2 \quad (4)$$

Here, among combinations of the two reference points, a parallax of the reference point 1 farther from the stereo camera 10 is set to a parallax 1 and a white line width thereof is set to a white line width 1. Similarly, a parallax of the reference point 2 closer to the stereo camera 10 is set to a parallax 2 and a white line width thereof is denoted as a white line width 2. As shown in FIGS. 5A and 5B, in a case in which pairs (1, 5), (2, 6), (3, 7), (4, 8) of the reference point exist, for example, a parallax of a reference point 5 farther from the stereo camera 10 is set to the parallax 1 and a white line width thereof is set to the white line width 1. Similarly, a parallax of the reference point 1 closer to the stereo camera 10 is set to a parallax 2 and a white line width thereof is denoted as a white line width 2. Similarly, a parallax of a reference point 6 farther from the stereo camera 10 is set to the parallax 1 and a white line width thereof is set to the white line width 1. Similarly, a parallax of the reference point 2 closer to the stereo camera 10 is set to a parallax 2 and a white line width thereof is denoted as a white line width 2.

That is, the cost function represented by Equation (4) is a function obtained by adding a square of a value of an intercept of each of the pairs (1, 5), (2, 6), (3, 7), (4, 8) of the reference point. That is, the parameter acquiring circuit 218 calculates an intercept of a linear equation showing a relationship between the parallax and the width from each of the combinations of two points of the two or more reference points 1 to 8, that is, point pairs (1, 5), (2, 6), (3, 7), (4, 8) based on the parallax of each of the two or more reference points on one reference line L1 and the width between the reference lines L1 and L2 of the parallel lines passing through the respective reference points, and defines the cost function based on the value of each intercept.

In addition, the parameter acquiring circuit 218 may multiply a weighting value w(d) whose value is increased as a value of an intercept d becomes smaller with the value based on each intercept, represented in Equations (5) to (7). Therefore, when the value of the intercept d is an extremely large value, the weight becomes smaller and an influence on the cost function becomes smaller. For this reason, in a case in which the parallax of the coordinate on the reference line is not linearly changed, that is, in a case in which the reference lines L1 and L2 are not parallel to each other in an actual space, the degradation of precision of the cost function may be avoided. In addition, it is possible to reduce an influence of errors in the imaging system of the camera 10 or the like.

$$\sum w(d) \times d^2 \qquad (5)$$

$$d = \left\{ -\frac{(\text{Parallax 1}) \cdot (\text{White line width 2}) - (\text{White line width 1}) \cdot (\text{Parallax 2})}{(\text{Parallax 2}) - (\text{Parallax 1})} \right\} \qquad (6)$$

$$w(d) = \begin{cases} \left\{1 - \left(\frac{d}{H}\right)^2\right\}^2, & (|d| \leq H) \\ 0, & (|d| > H) \end{cases} \qquad (7)$$

Here, H is an arbitrary integer. In order to minimize the cost function, the rotation matrix $M_L$ represented by Equations (2) and (3) is calculated.

The decision circuit 220 decides whether or not to perform the image correction processing based on the parameter of the image correction processing. For example, in a case in which the value of the rotation matrix $M_L$ acquired by the parameter acquiring circuit 218 exceeds a predetermined value, the decision circuit 220 decides to perform the image correction processing.

Figure 8:
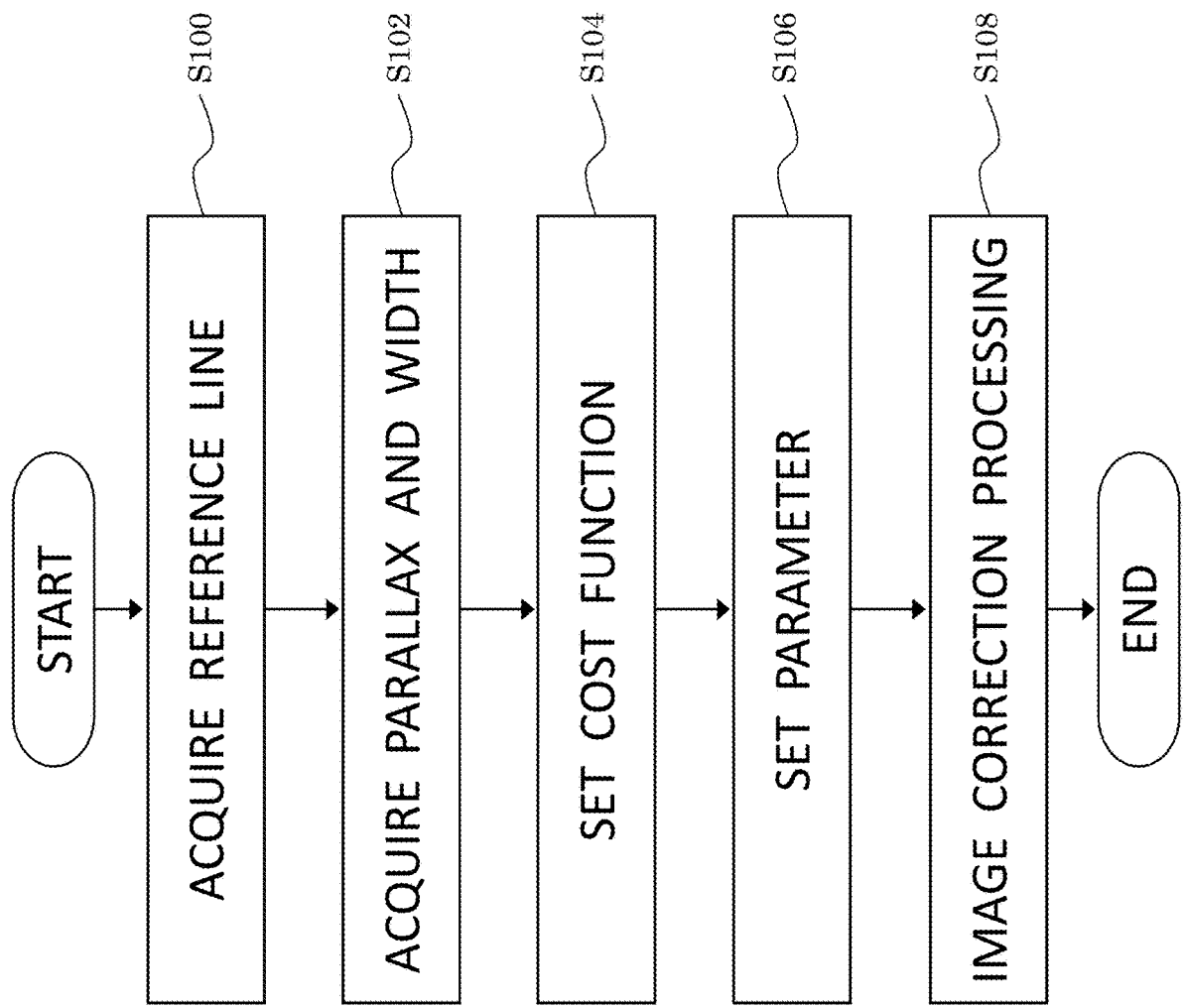
FIG. 8 is a flowchart showing an example of an image conversion processing of an image processing circuit.

FIG. 8 is a flowchart showing an example of an image conversion processing of the image processing circuit 202. As shown in FIG. 8, the reference line disposing circuit 212 disposes the two reference lines L1 and L2 whose widths change to a substantially linear shape in accordance with a distance from the stereo camera 10 in the first image (S100). Next, the image information acquiring circuit 216 acquires the parallax of each of the two or more reference points on one reference line L1, and the width between the reference lines L1 and L2 of the parallel lines passing through the respective reference points (S102).

Next, the parameter acquiring circuit 218 sets the cost function based on the parallax of each of the two or more reference points on one reference line L1 and the width between the reference lines L1 and L2 of the parallel lines passing through the respective reference points (S104), and acquires the image correction parameter of the image correction processing circuit 214 (S106). The image correction processing circuit 214 then performs the image correction processing for at least one of the first and second images by using the image correction parameter (S108). The image correction parameter may be acquired each time when the first image and the second image are acquired, and may be acquired at a specific timing, for example, in calibration of the driving support system 1.

As described above, according to the present embodiment, the two reference lines L1 and L2 corresponding to the parallel lines in the actual space are disposed in at least one of the first image and the second image, and the parameter of the image correction processing that reduces the parallax between the first image and the second image at the intersection point in which the two reference lines L1 and L2 are extended close to 0 is acquired. Therefore, in a case in which the image correction processing is performed for at least one of the first image and the second image by using the parameter of the image correction processing, the parallax of corresponding infinite points in the first image and the second image is reduced and is close to 0, such that it is possible to correct the image deformation involved in the yaw rotation in the imaging system of the stereo camera.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing device performing an image processing for a first image and a second image captured by a camera, the image processing device comprising:
    a first circuit configured to determine a first position of a first reference line and a second position of a second reference line in at least one of the first image and the second image;
    a second circuit configured to determine a image deformation reduction parameter based on a line width from a first reference point on the first reference line at the first position to a second reference point on the second reference line at the second position; and
    a third circuit configured to reduce image deformation in the first image or the second image based on the image deformation reduction parameter,
        wherein the second circuit is configured to generate a plurality of image deformation reduction parameters based on a plurality of line width from a plurality of first reference points on the first reference line at the first position to a plurality of second reference points on the second reference line at the second position, respectively.

2. The image processing device of claim 1, wherein the third circuit is configured to minimize a cost function of the plurality of image deformation reduction parameters.

3. The image processing device according to claim 2, wherein the third circuit is configured to minimize the cost function to be a zero value.

4. The image processing device of claim 1, wherein the two reference lines correspond to parallel lines in an actual space.

5. The image processing device of claim 1, wherein the third circuit is configured to perform the image correction processing by a homography matrix.

6. The image processing device of claim 2, wherein the second circuit defines the cost function based on a first parallax of a first point on one reference line of the two reference lines and a first width between reference lines of a first straight line passing through the first point, and intersecting with the other reference line, and a second parallax of a second point on one reference line and a second width between reference lines of a second straight line parallel to the first straight line, passing through the second point, and intersecting with the other reference line.

7. The image processing device of claim 6, wherein the second circuit defines the cost function in which the cost is minimized when a first ratio of the first parallax and the first width and a second ratio of the second parallax and the second width become equal to each other.

8. The image processing device of claim 2, wherein the second circuit each calculates an intercept of a linear equation showing a relationship between the parallax and the width from each combination of two points of two or more reference points based on the respective parallaxes of the two or more reference points on one reference line and widths between the reference lines of the parallel lines passing through the respective reference points, and defines the cost function based on a value of each intercept.

9. The image processing device of claim 7, wherein the second circuit calculates an intercept of a linear equation showing a relationship between the parallax and the width from each combination of two points of two or more reference points based on the respective parallaxes of the two or more reference points on one reference line and widths between the reference lines of the parallel lines passing through the respective reference points, and defines the cost function based on a value of each intercept.

10. The image processing device of claim 8, wherein the cost function is a function obtained by multiplying a weighting value whose value is increased as the value of the intercept becomes smaller with a value based on each intercept.

11. The image processing device of claim 1, further comprising a fourth circuit that decides whether or not to perform the image correction processing based on the parameter of the image correction processing.

12. The image processing device of claim 1, further comprising a fifth circuit that performs a three-dimensional processing based on the first image and the second image after the image correction processing is performed for at least one of the first image and the second image.

13. The image processing device of claim 11, further comprising a fifth circuit that performs a three-dimensional processing based on the first image and the second image after the image correction processing is performed for at least one of the first image and the second image.

14. The image processing device of claim 1, further comprising a display monitor that displays image information based on at least one of the first image and the second image corrected by the image correction processing.

15. The image processing device of claim 12, further comprising a display monitor that displays image information based on at least one of the first image and the second image corrected by the image correction processing.

16. The image processing device of claim 13, further comprising a display monitor that displays image information based on at least one of the first image and the second image corrected by the image correction processing.

17. A driving support system comprising:
the image processing device of claim 1; and
a driving support device that supports driving of a vehicle based on information obtained by the image processing device.

* * * * *